United States Patent Office 2,958,381
Patented Nov. 1, 1960

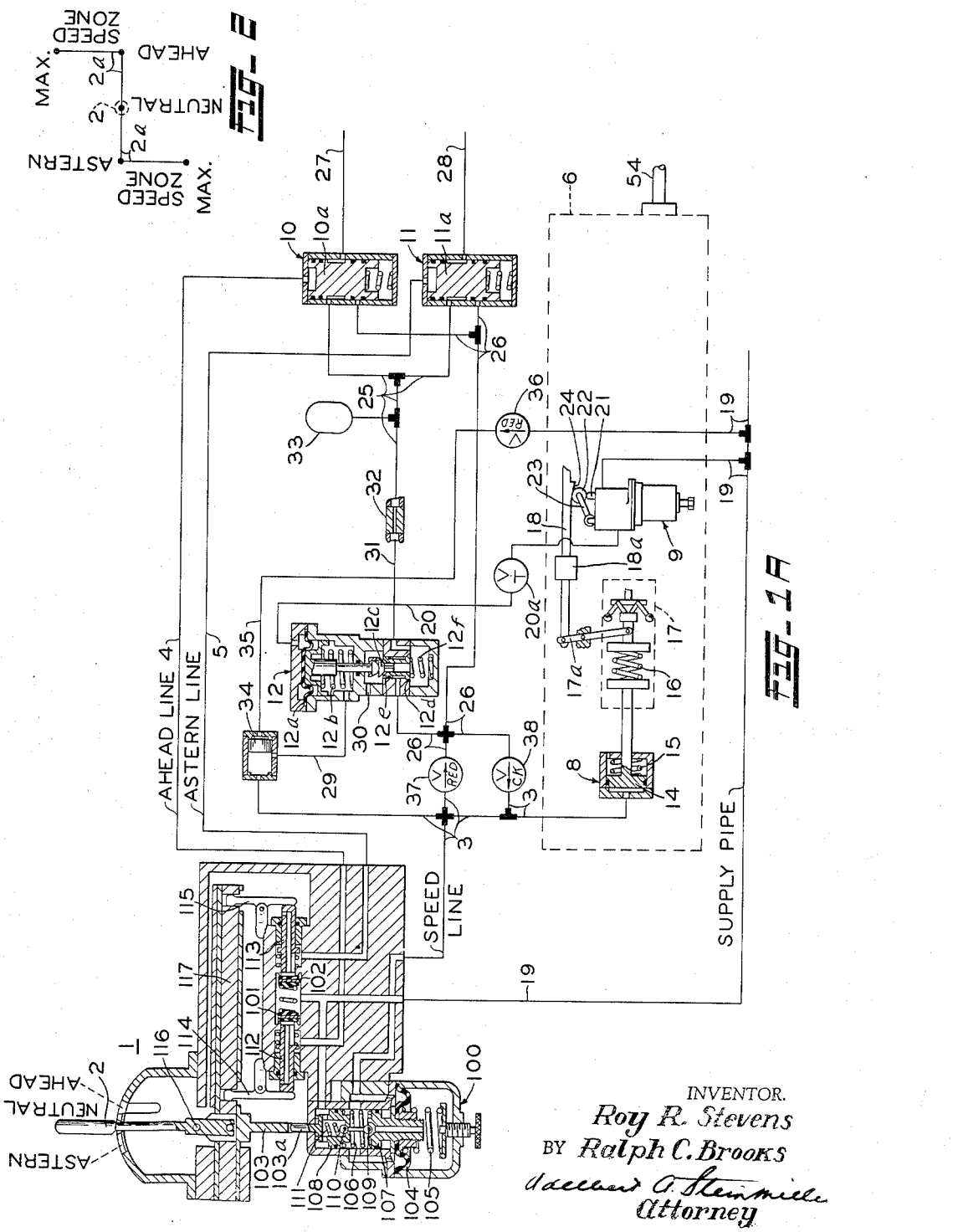

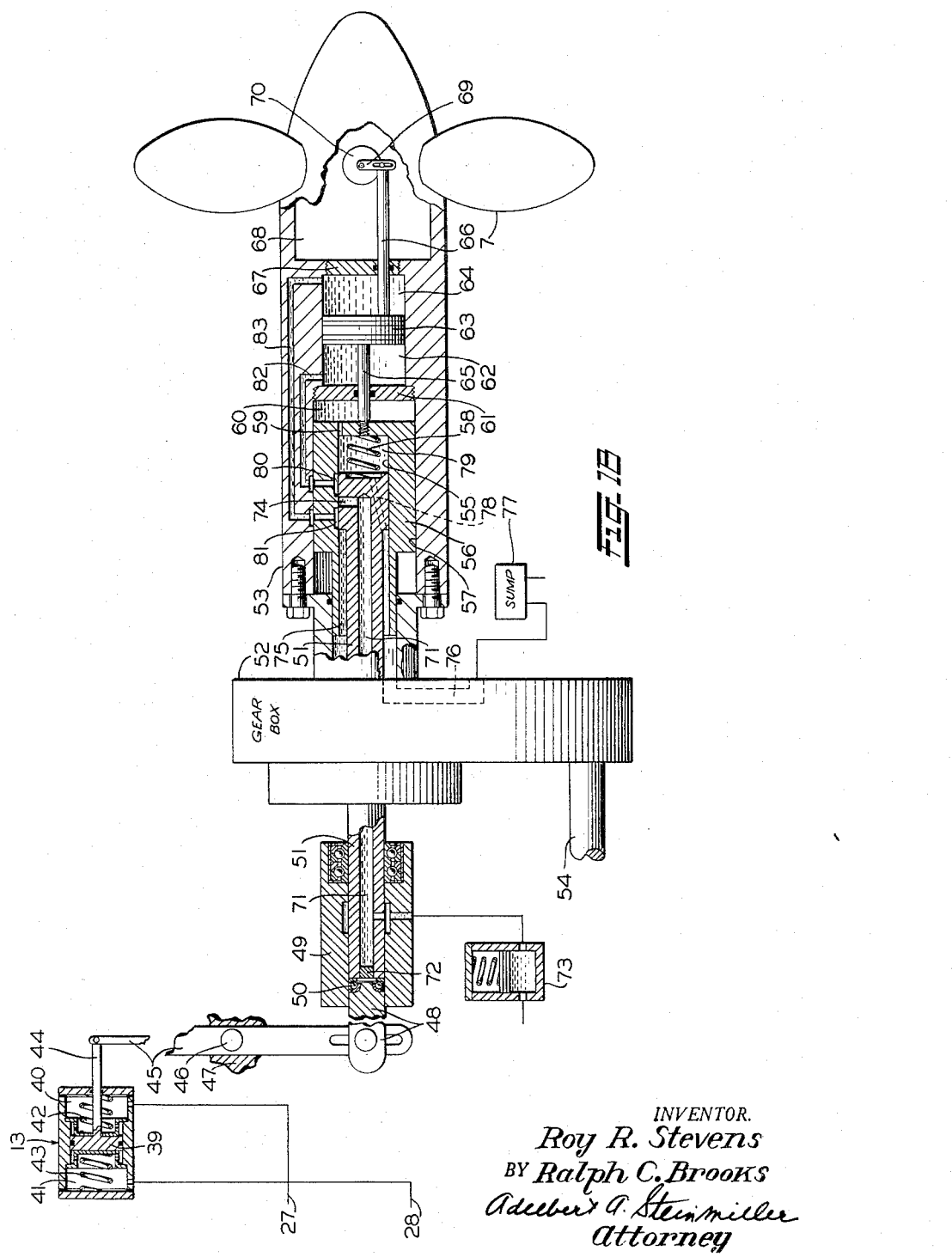

2,958,381

PITCH CONTROL ARRANGEMENT FOR VARIABLE PITCH PROPELLERS

Roy R. Stevens and Ralph C. Brooks, Falls Church, Va., assignors to Westinghouse Air Brake Company, Wilmerding, Pa., a corporation of Pennsylvania Filed July 9, 1958, Ser. No. 747,495

11 Claims. (Cl. 170—135.72)

This invention relates to pitch control arrangements for variable pitch propellers and more particularly to such arrangements including means for reducing both ahead and astern pitch of the propeller whenever engine load is excessive, in order to prevent overloading and stalling of a marine engine that drives such propeller.

According to the invention, there is provided a novel pitch control arrangement embodying novel means controlled by a load-controlled forces which varies according to engine load, and an opposing force which varies according to engine speed; said pitch modifying means being operative whenever said load-controlled force exceeds said opposing force to reduce propeller pitch and thereby engine load until said load-controlled force is reduced to substantially the existing value of said opposing force, so as thereby to prevent overloading of the engine.

This pitch control arrangement may comprise a double-acting power cylinder subject opposingly to fluid pressures in one chamber and in another chamber and biased, when said fluid pressures are substantially equal, to a neutral or flat pitch position; an ahead selector valve device for connecting said one chamber to one communication or another normally vented communication according to whether an ahead line is charged with fluid under pressure or vented by an operator; an astern selector valve device for connecting said other chamber to said one communication or said other communication according to whether an astern line is charged with fluid under pressure or vented by an operator, these ahead and astern lines being charged selectively when the operator desires that the vessel move ahead and astern, respectively; a speed line chargeable with fluid at a selectable pressure by the operator according to a desired engine speed; a load-sensing valve device, preferably controlled by a cam on the fuel rack of the engine, for providing a load-controlled fluid pressure corresponding to load condition of the engine as denoted by fuel rack position; and a pitch modifying device for disconnecting said other communication from atmosphere and connecting it to said one communication when said load-controlled fluid pressure exceeds fluid pressure in a different chamber chargeable from the speed line.

With this arrangement, the other communication will normally be vented for permitting the power cylinder to be actuated, whenever the ahead or astern line is charged, to provide ahead pitch or astern pitch, respectively, of a degree corresponding to the pressure of fluid provided in said one communication. However, if engine load should increase to a degree where the pitch modifying device operates to interconnect the said communications, then fluid under pressure will be supplied to the hitherto vented one of said chambers for reducing the differential across said power cylinder and consequently reducing propeller pitch and thereby engine load, until said load-controlled fluid pressure is reduced to substantially the existing value of speed line pressure.

This pitch control arrangement also preferably comprises means for limiting to a preselected value, such as about 30 p.s.i., the pressure of fluid which can be supplied to said one communication from the speed line, in which the pressure can be varied from atmospheric to a higher value, such as about 60 p.s.i.; and the power cylinder and mechanism controlled thereby are adjusted to provide maximum ahead or astern pitch when, with said other communication vented, pressure in said one communication attains said preselected value, such that pitch will normally be maintained at a maximum when speed line pressure is increased beyond said value for causing an increase in engine speed.

In the accompanying drawings, Figs. 1A and 1B, when taken together such that the right-hand edge of Fig. 1A is matched with the left-hand edge of Fig. 1B, constitute a schematic view of a pitch control apparatus embodying the invention; and Fig. 2 is a schematic view showing various handle positions of an operator-controlled valve device shown in Fig. 1A.

*Description*

As shown in the drawings, the pitch control apparatus embodying the invention comprises an operator-controlled valve device 1 of the well-known type used on ships and comprising valve means (below described) operable by movement of a handle 2 within a Z-shaped slot 2a (Fig. 2) to control pressures of fluid in a speed line 3, an ahead line 4 and an astern line 5 so as thereby operatively to control the speed of a respective engine 6 and also control the pitch of the blades of a variable pitch propeller 7; a governor speed-adjusting or actuator device 8; a load-sensing valve device 9; an ahead selector valve device 10; an astern selector valve device 11; a pitch modifying valve device 12; and a double-acting power cylinder 13 which, according to its position, operatively controls pitch of the blades of the propeller 7 through the medium of mechanism hereinafter to be described.

Valve device 1 may be of the type designated as a "2A—2A Controlair valve device" sold by Westinghouse Air Brake Company of Wilmerding, Pennsylvania which, as shown in simplified diagrammatic form comprises a self-lapping valve device 100 for controlling fluid pressure in the speed line 3 and also comprises poppet-type valves 101, 102 selectively unseatable for supplying pressure fluid to the ahead line 4 and astern line 5, respectively.

When handle 2 is in a neutral position, as shown in Figs. 1A and 2, a transversely rotatable heart-shaped cam 103 operably connected to said handle will exert no downward thrust on a control stem 103a. This will permit a diaphragm piston 104, that is subject opposingly to pressure of a helical spring 105 in an atmospheric chamber and to pressure of fluid in another chamber open to the speed line 3, to be biased upward by said spring into contact with a stop, as shown. This, in turn, will enable a spring 106, which seats against a release valve seat member 107 connected to piston 104, to bias a supply valve seat member 108, to which stem 103a is coaxially connected, upward far enough to unseat a release valve 109 from member 107 and thus vent speed line 3; it being noted that a supply valve 110, which is positively connected to release valve 109 and contained in a chamber open to a fluid pressure suply pipe 19, will then be seated by a light spring 111 against its seat member 108 and prevent seating of said release valve. Also, with handle 2 in neutral position, both poppet valves 101, 102 will be seated and their respective valve stems 112, 113 will be disengaged from their respective valves by being spring-iased away from each other to positions defined by lateral contact with depending arms of rockably fulcrumed levers 114, 115, respectively, and in which positions said valve stems will respectively connect the ahead line 4 and astern line 5 to atmosphere. Thus, lines 3, 4, 5 will concurrently be vented with handle 2 in neutral position as shown.

When the handle 2 is moved sideways in slot 2a either way out of neutral position, said handle will pivot at 116 and thereby reversely shift a perforated plate 117 into which the upper arms of levers 114, 115 project. Thus, if handle 2 is moved sideways to an ahead position (see Fig. 2), plate 117 will be shifted leftward as viewed in Fig. 1A and rock lever 114 toward valve stem 112 and rock lever 115 away from valve stem 113, causing lever 114 to shift stem 112 rightward to a position in which it cuts off ahead line 4 from atmosphere and operatively unseats ahead poppet valve 101 for permitting pressure fluid to flow therepast from supply pipe 19 to ahead line 4 for charging the latter. Conversely, if handle 2 is moved sideways to an astern position, plate 117 will rock lever 115 for shifting valve stem 113 leftward to cut off astern line 5 from atmosphere and then operatively unseat astern poppet valve 102 so that pressure fluid will be supplied therepast from supply pipe 19 to astern line 5.

When handle 2 is thereafter moved from either ahead position or astern position transversely into a corresponding speed zone (see Fig. 2), cam 103 acting through stem 103a will force seat member 108 downward against resistance of spring 106, and enable spring 111 to move supply valve 110 and hence release valve 109 downward until said release valve seats and thereby cuts off speed line 3 from atmosphere; whereupon as member 108 continues downward, supply valve 110 will be effectively unseated against resistance of spring 111 and supply pressure fluid from supply pipe 19 to speed line 3 until piston 104 and hence seat member 107 are moved downward far enough relative to seat member 108 to permit supply valve 110 and release valve 109 to be concurrently seated. Device 100 is thus operative to provide in speed line 3 fluid at a selectable pressure corresponding to the extent handle 2 is moved transversely toward a maximum speed position at the remote limit of each speed zone (see Fig. 2), the heart-shaped cam 103 having two symmetrical cam surfaces at each side of its low point which are of such configuration as to operatively provide a downward thrust force on member 108 that increases in direct proportion with extent of such transverse handle movement.

If the ship has two propellers, the valve device 1 may be used to control, for example, the starboard engine and propeller, and a separate valve device, identical with valve device 1, used for independently controlling apparatus similar to that above described and associated with a port engine and propeller.

The actuator device 8 may, for sake of illustration, comprise a piston 14 reciprocable within a casing and subject opposingly to pressure of fluid in the speed line 3 and to pressure of a helical bias spring 15 in an atmospheric chamber. Coaxially connected to piston 14 is a piston rod that extends through this atmospheric chamber and exteriorly of the casing and operatively engages a speeder spring 16 of a conventional fly-ball-type governor 17. When fluid pressure in speed line 3 increases sufficiently to overcome the opposing force of spring 15, piston 14 will be shifted and through its piston rod impose on the speeder spring 16 a bias or preload, proportionate to the net force on said piston, for causing governor 17 to control the rockable position of a suitably fulcrummed lever 17a which, in turn, controls the axial position of a fuel rack 18 of a fuel injection pump 18a that controls fuel supply to the engine 6.

The load-sensing valve device 9 may be of any well-known type, such as shown in Fig. 3 of U.S. Patent No. 2,642,962, granted on June 23, 1953 to F. S. Whaley and assigned to the assignee of the present invention, which is identical with the valve device 100 of device 1. This valve device 9 comprises, briefly, self-lapping valve means (like 109, 110) operable to supply from a branch of supply pipe 19 to a pipe 20, via a stabilizing choke or throttle valve 20a, fluid at a pressure which is proportionate to the extent of depression of a control stem 21 (like 103a). Depression of this stem 21 is preferably controlled by a roller follower 22 which is carried by a suitably fulcrummed lever 23 and engages a cam 24 on fuel rack 18, such that the valve device 9 will operate to provide in pipe 20 fluid at a load-controlled pressure proportionate to engine load as denoted by axial position of the fuel rack.

The ahead selector valve device 10 comprises, briefly, a spring-biased valve 10a, such as of the spool-valve type, operative to selectively connect a pipe 25 or a pipe 26 to a pipe 27 according to whether the ahead line 4 is vented or is charged with fluid under pressure, respectively. The astern selector valve device 11 comprises a spring-biased valve 11a, such as of the spool-valve type, operative to selectively connect pipe 25 or pipe 26 to a pipe 28 according to whether astern line 5 is vented or is charged with fluid under pressure, respectively. These devices 10, 11, as shown and above described, are substantially similar to the selector valve device, designated 20, in Fig. 1A of U.S. Patent 2,812,985 granted November 12, 1957 to Thomas et al., and assigned to the assignee of the present invention.

The pitch modifying valve device 12 may be of any well-known self-lapping type such as disclosed in Fig. 2 of U.S. Patent 2,760,612, granted on August 28, 1956 to R. C. Brooks and assigned to the assignee of the present invention.

This device 12 comprises a diaphragm piston 12a subject to pressure of fluid in pipe 20 acting in opposition to the combined pressures of fluid in a pipe 29 and of a light bias spring 12b for controlling selective or concurrent seating of two coaxially arranged valves 12c, 12d. Piston 12a is biased by spring 12b to a normal position in which it is shown and in which valve 12c, which is positively connected to said piston, is unseated from a plunger 12e for connecting a vent port 30 to a pipe 31, and valve 12d which is formed integrally with said plunger is seated by a light bias spring 12f for cutting off pipe 31 from pipe 26. When pressure in pipe 20 exceeds said combined pressures of fluid in pipe 29 and of spring 12b, piston 12a will shift to an abnormal position during which it will successively seat valve 12c against plunger 12e for cutting off pipe 31 from vent port 30 and then through such contact operatively unseat valve 12d against the force of spring 12f for connecting pipe 31 to a branch of pipe 26; but when pressure in pipe 20 substantially balances said combined pressures, said piston will shift to a lap position in which valve 12c is partially retracted for permitting concurrent seating of both valves 12c, 12d and in which pipe 31 is cut off from both vent port 30 and pipe 26. Pipe 31 is always open, preferably via a choke 32 and a stabilizing volume 33, to the pipe 25.

Pressure of fluid in pipe 29 is preferably controlled by a shuttle valve or double check valve 34 which operates to connect pipe 29 to branch of speed line 3 or to a pipe 35 according to which of these (line 3 or pipe 35) contains fluid at the higher pressure; said pipe 35 being constantly charged from a branch of supply pipe 19 by way of a reducing valve 36 with fluid at a preselected value of pressure, such as about 30 p.s.i., for reasons hereinafter to be explained.

A reducing valve 37 and a check valve 38 are preferably interposed in parallel between branches of speed line 3 and pipe 26 so as to permit pressure in pipe 26 to vary with speed line pressure so long as the latter does not exceed the aforementioned preselected value (30 p.s.i.) but limit the pressure in pipe 26 to said preselected value when speed line pressure, which has a range of from 0 to a high pressure such as 60 p.s.i., exceeds said preselected value of 30 p.s.i. If desired, there may be substituted for the valves 37 and 38 a limiting valve of the type controlled by speed line pressure opposing a spring bias equivalent to 30 p.s.i. and operative to connect pipe 26 to the speed line 3 only when speed line pressure is equal to or less than said preselected value.

The power cylinder 13 may comprise a piston 39 reciprocable within a sectionalized casing and subject opposingly to pressures of fluid in a chamber 40 open to pipe 27 and in a chamber 41 open to pipe 28. Helical bias springs 42, 43 are provided in chambers 40, 41, respectively, and suitably caged to limit the extent of their expansion in the direction of the piston 39. When the pressures of fluid in chambers 40, 41 are substantially equal, the piston 39, and hence a piston rod 44 connected to said piston and projecting exteriorly of the casing, will be biased by springs 42, 43 to a neutral or flat pitch position, in which they are shown. When pressure in chamber 40 exceeds that in chamber 41, spring 42 will be caged so as to be ineffective to exert a bias on piston 39, and said piston and thereby piston rod 44 will be shifted leftward by fluid pressure in chamber 40 against the pressure of fluid in chamber 41 and the force of spring 43 for operatively adjusting the pitch of the propeller blades to provide an ahead pitch of a degree corresponding to the magnitude of the differential in fluid pressures in the chambers 40, 41; and, conversely, when pressure in chamber 41 exceeds that in chamber 40, spring 43 will be caged and the piston 39 and thus piston rod 44 will be shifted rightward by pressure in chamber 41 against the lesser pressure in chamber 40 and the pressure of spring 42 for operatively adjusting the pitch of the propeller blades to provide astern pitch of a degree corresponding to the magnitude of such fluid pressure differential, such as in the manner now to be described.

Adjacent its projecting end the piston rod 44 may be pin-connected to one end of a lever 45 that is rockably fulcrummed intermediate its ends on a pin 46 carried by a fixed member 47 and at its opposite end has pin-in-slot connection with a rod 48. This rod 48 is axially slidable within a bore through a fixed member 49 and is operatively connected through the medium of a thrust bearing 50 to a valve element 51 that is rotatable within member 49 and projects exteriorly thereof and through a hole in a conventional reduction gear box 52 into a sectionalized propeller shaft 53. The gear box 52 transmits power from a drive shaft 54 of the engine 6 to the propeller shaft 53 and thereby to the propeller 7. Adjacent its inner end valve element 51 has an enlarged diameter portion having sealing, slidably guided contact with the wall of a bore 55 in another valve element 56 that is reciprocable within a larger bore 57 in propeller shaft 53; the base of bore 55 providing a seat for a light bias spring 58 that bears against the inner end of valve element 51 for maintaining the other end of valve element 51 in contact with the thrust bearing 50.

Valve element 56 has a port 59 connecting the inner end of bore 55 with a chamber 60 that is separated by a partition 61 in the propeller shaft 53 from a chamber 62 at one side of a piston 63 having a chamber 64 at its opposite side.

Coaxially connected to the chamber 62 side of piston 63 is a piston rod 65 that extends sealingly through partition 61 and is positively connected to valve element 56 for controlling its position; and eccentrically connected to the chamber 64 side of piston 63 is a rod 66 that projects sealingly through a propeller shaft partition 67 separating chamber 64 from a non-pressure chamber 68. At its projecting end rod 66 has pin-in-slot connection with a crank 69 that is keyed to a rotatable member 70 so as to rotate the latter counterclockwise or clockwise about its axis according to whether piston 63 is moved rightward or leftward, respectively. When member 70 is rotated counterclockwise from a flat pitch position in which it is shown, it will operatively adjust the pitch of the propeller blades to provide ahead pitch of a degree corresponding to the extent of such counterclockwise movement; where as when member 70 is rotated clockwise, it will operatively adjust the pitch of said blades to provide astern pitch of a degree corresponding to the extent of such clockwise movement.

Valve element 51 has a central bore-like passage 71 sealed at one end by a plug 72 and constantly charged, via suitable ports in said valve element and in fixed member 49, with hydraulic fluid under pressure from a suitable source, such as an accumulator 73. Through the enlarged diameter portion of valve element 51 is drilled a radial port 74 via which passage 71 communicates with bore 55 in valve element 56; and adjacent said enlarged diameter portion is an annular chamber 75 which surrounds the valve element 51 and is constantly open via a communication 76 in gear box 52 to a sump 77. Valve element 51 also has a passageway 78 which interconnects chamber 75 with a chamber 79 containing spring 58, whereby the chambers 75, 79 and 60 will always contain unpressurized hydraulic fluid.

The relatively movable valve elements 51, 56 constitute a control valve which, with said valve elements in the respective positions in which they are shown, will assume a lap position. In this position, port 74 is disposed between and out of registry with elongated annular ports 80, 81 provided in valve element 56 and constantly open via passages 82, 83 in propeller shaft 53 to chambers 62, 64, respectively; and ports 80, 81 are also cut off from the chambers 79, 75 and thus from the sump 77.

Thus, when piston rod 44 is moved leftward an extent corresponding to the degree of ahead pitch desired, rod 48 will be shifted rightward a proportionate extent by lever 45 and thereby correspondingly shift valve element 51 rightward relative to the then stationary valve element 56 for not only uncovering port 74 to port 80 so as to supply hydraulic pressure fluid to chamber 62, but also at the same time uncovering chamber 75 to port 81 for connecting chamber 64 to the sump 77 so that hydraulic fluid can be displaced to said sump. Hence, piston 63 will be shifted rightward and operatively shift valve element 56 rightward relative to the now stationary valve element 51 until the control valve 51, 56 assumes its previously defined lap position; whereupon the degree of ahead pitch of the propeller blades will have been adjusted by said piston, in the manner already described, to that degree called for by the axial position of valve element 51 which, in turn, is controlled by the extent piston 39 and piston rod 44 of power cylinder 13 are moved leftward from the flat pitch position in which they are shown. When piston 39 and piston rod 44 are subsequently moved rightward, valve element 51 will be operatively shifted leftward a corresponding extent and thus connect chamber 62 to chamber 79 and hence sump 77 and at the same time connect chamber 64 to port 74 and hence accumulator 73 for causing piston 63 and hence valve element 56 to be shifted leftward and operatively reduce the degree of ahead pitch until the control valve 51, 56 reassumes its lap position.

If, on the other hand, valve element 51 is moved leftward from the flat pitch position in which it is shown, piston 63 will be moved leftward a corresponding extent for operatively increasing the degree of astern pitch until control valve 51, 56 reassumes its lap position; and the degree of astern pitch will thereafter be reduced according to the extent valve element 51 is subsequently moved rightward toward its flat pitch position, as will be understood from previous description.

The mechanism just described, whereby the power cylinder 13 operatively controls the pitch of the blades of propeller 7, is merely illustrative and forms no part of the present invention and is described herein only for purposes of showing a fully operative apparatus. For purposes of the present invention, it is important merely to bear in mind that the piston 39 of power cylinder 13 operatively controls the degree of ahead pitch and astern pitch of the propeller blades according to the extent it is shifted in one direction or the opposite direction, respectively, from its previously defined flat pitch position.

Operation

Assume initially that the supply line 19 is charged with fluid at a pressure well in excess of 60 p.s.i., and that handle 2 of valve device 1 is in a neutral position in which it is shown. Under these conditions, the speed line 3, ahead line 4, and astern line 5 will be vented concurrently, as above described; the fuel rack 18 will be in a fuel-off position; the ahead and astern selector valve devices 10, 11 will respectively connect pipes 27, 28 to branches of pipe 25; piston 12a of pitch modifying valve device 12 will be biased to its previously defined normal position for causing pipe 31 to be connected to vent port 30; and power cylinder 13 will be biased to its flat pitch position. Hence all components will be in the respective positions in which they are shown in the drawings.

To move the vessel ahead, the fuel rack 18 is moved to idle position, the engine is started, and the handle 2 of valve device 1 is initially moved rightward (Fig. 2) in its slot 2a to its ahead position, in which ahead line 4 is charged from supply line 19 via valve 101 for causing ahead selector valve device 10 to connect pipe 26 to pipe 27, while astern line 5 is maintained vented for causing valve device 11 to maintain pipe 25 connected to pipe 28. Handle 2 is then moved arcuately (transversely) in the slot from ahead position into the ahead speed zone (Fig. 2) for providing in speed line 3 fluid at a selectable pressure of from 0 to 60 p.s.i. corresponding to a desired speed of engine 6 as selected according to the extent of movement of said handle into said speed zone.

Meanwhile, pipe 29 will be charged with fluid at the aforementioned preselected value of pressure (assumed as 30 p.s.i.) via reducing valve 36, pipe 35 and double check valve 34 for biasing piston 12a of valve device 12 to a normal position in which pipe 31 is connected to vent port 30. This will prevent device 12 from operating to interconnect pipes 25, 26 unless load-controlled pressure in pipe 20 exceeds said preselected value of 30 p.s.i. Hence, fluid under pressure will normally flow from speed line 3 via reducing valve 37 to pipe 26 and thence via device 10 and pipe 27 to chamber 40 of power cylinder 13 for causing the piston 39 and piston rod 44 to be moved leftwardly against resistance of spring 43 for providing ahead pitch proportionate to the degree of pressurization of chamber 40; it being noted that chamber 41 will then be vented via pipe 28, device 11 and the then vented pipes 25, 31. Ahead pitch will thus normally increase directly with speed line pressure until such pressure attains the aforementioned preselected value of 30 p.s.i., at which time such pitch will be at a maximum.

Meanwhile, when the bias force of speed line pressure exceeds the opposing bias force of spring 15 of actuator device 8, piston 14 will shift and increase the bias on the governor speeder spring 16 and thus cause the governor 17 operatively to shift fuel rack 18 leftward so as to increase fuel supply to the engine; and the load-sensing valve device 9 will operate to supply fluid via throttle valve 20a to pipe 20 at a pressure proportional to engine load condition as denoted by axial position of the fuel rack cam 24. Thus, if it is desired that the propeller pitch be increased to a maximum while the engine is idling, then the bias force of spring 15 should be equivalent to 30 p.s.i. of speed line pressure so that the bias of the governor speeder spring 16 will not be increased and cause leftward shifting of fuel rack 18 to provide increased engine speed until speed line pressure exceeds 30 p.s.i. (at which maximum pitch is obtained); whereas, if it is desired that engine speed commence to increase before pitch is at a maximum, the bias force of spring 15 should be correspondingly reduced. In either event, after speed line pressure exceeds 30 p.s.i., maximum pitch will be maintained; and increases in speed line pressure to values between 30 p.s.i. and 60 p.s.i. will normally cause fuel rack 18 to be shifted correspondingly leftward for providing successively increased engine speeds and thus higher load-controlled pressures in pipe 20.

As above stated, the chosen bias force of spring 15 of actuator device 8 will determine the value of speed line pressure and hence the degree of pitch at which the governor 17 will be conditioned to commence effecting an increase in engine speed above its idling speed. If while the engine is idling or is at some higher speed and propeller pitch is less than maximum or is at a maximum, the engine tends to become overloaded, the fuel rack 18 will be shifted leftward beyond the position called for by the bias of speeder spring 16 and thus cause device 9 to effect an increase in load-controlled fluid pressure in pipe 20; and if such pressure should exceed 30 p.s.i. or existing speed line pressure (whichever is higher), the pitch modifying valve device 12 will operate to cut off pipe 31 from vent port 30 and connect pipe 31 to pipe 26, for causing fluid under pressure to flow via pipes 26, 31 and choke 32 to pipe 25 and to volume 33 and thence via device 11 and pipe 28 to chamber 41 for providing a controlled rate of buildup in pressure in said chamber.

As pressure in chamber 41 increases, the fluid pressure differential across power cylinder piston 39 will be decreased and cause piston rod 44 to move slowly rightward for actuating previously described mechanism to effect a reduction in the degree of ahead pitch and thereby in engine load until the load-controlled pressure in pipe 20 is reduced to substantially 30 p.s.i. or to the existing value of speed line pressure (whichever is the higher); whereupon the device 12 will assume its previously defined lap position in which pipe 31 is cut off both from vent port 30 and pipe 26 for bottling up fluid under pressure in pipe 31 and thus in chamber 41 of power cylinder 13. Upon a subsequent increase in speed line pressure or a reduction in engine load, the device 12 will reassume its normal position in which pipe 31 and thus chamber 41 is vented via port 30; whereupon pitch will once again be controlled directly according to the pressure existing in pipe 26.

It will thus be seen that the pitch modifying valve device 12 is capable of operating to automatically reduce propeller pitch to prevent overloading of the engine while pitch is being increased to a maximum and also while pitch is at a maximum.

To reduce engine speed without reducing pitch, handle 2 of device 1 is moved to reduce speed line pressure to some value not less than the illustrative 30 p.s.i.; whereas to reduce both engine speed and pitch, said handle is moved to reduce speed line pressure to some value below 30 p.s.i.

To move the vessel astern, handle 2 of device 1 is moved leftward in slot 2a to astern position (Fig. 2) for charging astern line 5 while maintaining ahead line 4 vented, and thus causing valve device 11 to connect pipe 26 to pipe 28 and valve device 10 to maintain pipe 25 connected to pipe 27. Hence, while handle 2 is moved from astern position into the astern speed zone (Fig. 2) to provide fluid at a desired pressure in the speed line, such fluid will flow via device 11 to chamber 41 of the power cylinder 13 and cause the latter to operate to effect an increase in astern pitch from flat pitch to a maximum, as pressure in pipe 26 is increased from zero to the preselected value of 30 p.s.i.; and maximum astern pitch will thereafter be maintained as speed line pressure is increased above 30 p.s.i. for effecting increases in engine speed. As will be understood from previous description, the pitch modifying valve device 12 will operate to reduce astern pitch whenever engine load and hence the load-controlled fluid pressure in pipe 20 exceeds 30 p.s.i. or the existing value of speed line pressure (whichever is the higher).

It will be understood that, if desired, the double check valve 34 and reducing valve 36 may be eliminated and the speed line 3 connected directly to pipe 29, if it is preferred that the pitch be reduced whenever load-controlled pressure in pipe 20 exceeds existing speed line pressure, rather than when the latter pressure exceeds 30 p.s.i. or speed line pressure whichever is the higher. While it is preferable that engine pitch be increased to a maximum or to substantially a maximum while the engine is idling, the bias force of spring 15 of actuator device 8 may be altered, if desired, to normally provide concurrent increases in engine speed and propeller pitch. While it is more efficient and therefore preferable to provide a limiting or reducing valve 37 so that engine speed can be increased over a wide range while propeller pitch is at a maximum, valve 37 and the check valve 38 may be eliminated, if desired, and speed line 3 connected directly to pipe 26, in which case maximum pitch will be obtained when piston 39 of cylinder 13 reaches the respective outer limits of its stroke and pressure in chamber 40 or 41, as the case may be, will increase uniformly with speed line pressure.

Having now described the invention, what we claim as new and desire to secure by Letters Patent is:

1. In a control arrangement for modifying pitch of a variable pitch propeller to prevent overloading of a propeller-driving engine, the combination with the propeller and the engine, of power means including a piston operatively controlling pitch of the propeller according to the position of said piston, said piston being biased to a flat pitch position and controlled by opposing fluid pressures in two chambers and operative when pressure in one of said chambers preponderates over that in the other chamber to move in one direction against such bias for operatively causing pitch to be increased to an extent corresponding to the magnitude of the differential in said opposing fluid pressures, a speed line to which fluid is supplied by the operator at a selectable pressure corresponding to a desired engine speed, a mechanical governor driven by the engine and having a speeder spring the preload on which determines the speed setting of the governor, actuator means controlled by speed line pressure opposing a bias pressure and operative to increase the preload on said speeder spring in direct proportion with speed line pressure after said bias pressure has been overcome so as to prevent an increase in engine speed from idle speed to a higher speed until said bias pressure has been overcome, one communication via which fluid under pressure may flow from said speed line to said one chamber for causing an increase in pitch, another communication normally vented and leading to the other of said chambers, a fuel adjusting element operatively positioned by the governor to adjust fuel flow to the engine, load-sensing means controlled according to positioning of said element and providing a load-controlled fluid pressure corresponding to the load condition of the engine, and pitch modifying means operative to disconnect said other communication from atmosphere and connect it to said one communication when said load-controlled fluid pressure exceeds speed line pressure, for thereby reducing said differential across said piston and thereby causing said piston to be moved in the opposite direction for reducing the degree of pitch and hence engine load until said load-controlled fluid pressure is reduced to substantially the existing value of speed line pressure.

2. The combination of a variable pitch propeller, an engine driving the propeller and having a fuel-flow regulating element, a governor driven by the engine and operative to position said element to maintain an engine speed corresponding to the governor speed setting, a speed line chargeable by an operator with fluid at a selectable pressure corresponding to a desired engine speed, actuator means operatively connected to the governor to vary said speed setting responsively to variations in speed line pressure, a power cylinder operatively controlling pitch of the propeller and biased to a flat-pitch position and operable toward a maximum-pitch position an extent corresponding substantially to the degree by which fluid pressure in one chamber supplied with fluid under pressure from said speed line exceeds the opposing fluid pressure in another normally vented chamber, a pitch modifying device subject to one force substantially proportional to engine load as denoted by the position of said fuel-flow regulating element and an opposing force substantially proportional to desired engine speed as denoted by speed line pressure, and responsive to overload of the engine as denoted by preponderance of said one force over said opposing force to supply pressure fluid to said normally vented chamber for automatically causing reduction in propeller pitch and thereby in engine load until said one force is reduced to substantially the existing value of said opposing force.

3. The combination of a variable pitch propeller, an engine driving the propeller and having a fuel-flow regulating element, a load-sensing device controlled by said element and operative to provide fluid at a pressure substantially proportional to engine load as denoted by the position of said element, a governor driven by the engine and operative to position said element to maintain an engine speed corresponding to the governor speed setting, a speed line chargeable by an operator with fluid at a selectable pressure corresponding to a desired engine speed, actuator means operatively connected to the governor to vary said speed setting responsively to variations in speed line pressure, a power cylinder operatively controlling pitch of the propeller and biased to a flat-pitch position and operable toward a maximum pitch position a degree corresponding substantially to the extent by which fluid pressure in one chamber supplied with fluid under pressure from said speed line exceeds the opposing fluid pressure in another normally vented chamber, and pitch modifying means operative when the first-mentioned pressure exceeds speed line pressure in consequence of overload of the engine to supply pressure fluid from said speed line to said normally vented chamber to cause a reduction in propeller pitch and thereby in engine load until said first-mentioned pressure is reduced to substantially the existing value of speed line pressure.

4. The combination of a variable pitch propeller, an engine driving the propeller, means regulating flow of fuel to the engine, load-sensing valve means controlled by said regulating means and operative to provide a load-controlled fluid pressure corresponding to engine load as indicated by said regulating means, a governor driven by the engine and operatively controlling positioning of said regulating means, said governor comprising a member adjustable to vary the speed setting of the governor and hence the engine speed to be maintained thereby, a speed line chargeable by an operator with fluid at a selectable pressure corresponding to a desired engine speed, means including a piston subject to speed line pressure for operatively adjusting said member to vary said speed setting in accordance with changes in speed line pressure, a double-acting power cylinder operatively controlling according to its position the degree of pitch of the propeller, said power cylinder being subject opposingly to fluid pressures in one chamber and in another chamber and biased when pressures in said chambers are equal to a flat-pitch-providing position and operable toward a maximum-pitch-providing position an extent corresponding to the differential in fluid pressures in said chambers, one fluid-conveying communication via which pressure fluid is normally conveyed from said speed line to one of said chambers to cause pitch to increase as speed line pressure increases, another fluid-conveying communication connected to the other chamber, and pitch modifying valve means subject opposingly to said load-controlled fluid pressure and said speed line pressure and biased to a normal position for venting said other communication and operative responsively to preponderance of said load-controlled fluid pressure over speed line pressure to an abnormal position to cut off said other communication from its vent and supply pressure fluid thereto for reducing said differential to cause a reduction in propeller pitch, whereby propeller pitch will normally be controlled according to variations in speed line pressure and will be automatically reduced whenever such preponderance of said load-controlled fluid pressure denotes overload of the engine at the existing engine speed.

5. The combination according to claim 4, wherein said piston is subject to a bias pressure opposing speed line pressure, whereby as speed line pressure increases from zero said power cylinder will be actuated by pressure fluid supplied to said one communication to effect a substantial increase in propeller pitch before said member is adjusted to increase said speed setting for causing an increase in engine speed.

6. The combination of a variable pitch propeller, an engine driving the propeller, an element regulating flow of fuel to the engine, a load sensing device controlled according to the position of said element and operative to provide fluid at a pressure substantially proportional to engine load as denoted by such position, a governor driven by the engine and operative to position said element to maintain an engine speed corresponding to the governor speed setting, a speed line chargeable by an operator with fluid at a selectable pressure corresponding to a desired engine speed, actuator means operatively connected to the governor to vary said speed setting responsively to variations in speed line pressure, power means subject opposingly to fluid pressures in two chambers and having a driven member movable in opposite directions away from a predetermined flat pitch position to increase the pitch of the propeller in ahead and astern pitch ranges according to the magnitude and direction of the fluid pressure differential across said chambers, one communication always charged with pressure fluid from and vented via said speed line, another communication, selector valve means operatively controlled by the operator to concurrently connect said one communication to one of said chambers while connecting said other communication to said other chamber, or vice versa, to precondition said power means to normally increase propeller pitch in said ahead range or astern range, respectively, in direct response to increases in speed line pressure as noted in said one communication, and pitch modifying means normally venting said other communication and operative to supply pressure fluid to said other communication when the first-mentioned pressure exceeds speed line pressure in consequence of overload of the engine to reduce the magnitude of said differential and thereby cause a reduction in propeller pitch and engine load until said first-mentioned pressure is reduced to substantially the existing value of speed line pressure.

7. The combination according to claim 6, including flow-restricting means interposed in said other communication to restrict the rate at which pressure fluid can be supplied by said pitch modifying means via said selector means to said power means, thereby to control the rate at which propeller pitch is reduced under an engine overload condition.

8. The combination of a variable pitch propeller, an engine driving the propeller and having a fuel-flow regulating element, a load sensing device operative to provide fluid at a pressure substantially proportional to engine load as denoted by the position of said element, a governor driven by the engine and operative to position said element to maintain an engine speed corresponding to the governor speed setting, a speed line chargeable by an operator with fluid at a selectable pressure corresponding to a desired engine speed, actuator means comprising a piston subject opposingly to speed line pressure and to a bias pressure and operative to vary said governor speed setting from idle to a maximum in direct proportion with speed line pressure as the latter increases above a predetermined value, power means subject opposingly to fluid pressures in two chambers and having a driven member movable in opposite directions away from a predetermined flat pitch position to increase the pitch of the propeller in ahead and astern pitch ranges according to the magnitude and direction of the fluid pressure differential across said chambers, one pipe, valve means interposed between said one pipe and speed line to limit the pressure of fluid supplied from said speed line to said one pipe to a preselected value which is less than the maximum pressure providable in said speed line, another pipe, selector valve means operatively controlled by the operator to connect said one pipe to one of said chambers and concurrently connect said other pipe to said other chamber, or vice versa, to precondition said power means to normally increase propeller pitch in said ahead range or astern range, respectively, in direct response to increases in pressure in said one pipe, another line containing fluid at said preselected value of pressure, a valve operative to connect a third chamber to said other line or said speed line according to which of these lines contains fluid at the higher pressure, and pitch modifying means operative to selectively connect said other pipe to a vent or to a branch of said one pipe according to whether the first-mentioned pressure is respectively less than or exceeds the pressure in said third chamber, whereby propeller pitch in both the ahead and astern ranges will normally be controlled according to the pressure provided in said one pipe but propeller pitch and hence engine load will be reduced automatically when said first-mentioned pressure exceeds the pressure in said third chamber and thus indicates an overload condition of the engine, and whereby the chosen magnitude of said predetermined value in relation to said preselected value will determine the degree propeller pitch will increase in either of said ranges before engine speed is increased from an idling speed.

9. The combination according to claim 8, including an ahead line and an astern line, operator-controlled valve means for concurrently venting or selectively charging said ahead line and astern line, and wherein said selector valve means comprises an ahead selector valve responsive to charging and venting of said ahead line to respectively connect said one chamber with said one pipe or other pipe, and an astern selector valve responsive to charging and venting of said astern line to respectively connect said other chamber with said one pipe or other pipe, whereby said one chamber and other chamber will be concurrently vented when said ahead and astern lines are concurrently vented so as to cause said driven member to assume its flat-pitch position and said driven member will, as speed line pressure increases, effect increases in pitch in said ahead range or astern range according to whether the ahead line or astern line is selectively charged.

10. In combination, a variable pitch propeller, an engine driving the propeller, an element variously positioned in accordance with the existing load condition of the engine, valve means operative according to the position of said element to provide a fluid pressure proportional to said existing load condition, a speed line chargeable by an operator with fluid at a selectable pressure corresponding to a desired engine speed, a governor driven by the engine and controlling fuel flow thereto to maintain an engine speed corresponding to the speed setting of the governor, actuator means varying the speed setting responsively to variations in speed line pressure, a power device variously positionable to thereby operatively control pitch of the propeller, said device being subject to opposing fluid pressures in one chamber and another chamber and biased to a predetermined flat-pitch-providing position when said chambers are concurrently vented and operable therefrom toward a maximum pitch-providing position a degree corresponding to the extent by which pressure in said one chamber exceeds that in said other chamber, means operative to increase and decrease pressure in said one chamber responsively to increases and decreases in speed line pressure, and a pitch modifying device subject opposingly to the first-mentioned fluid pressure and speed line pressure and normally biased to connect said other chamber to a vent and operative when said first-mentioned fluid pressure exceeds speed line pressure due to overload of the engine to disconnect said other chamber from the vent and supply pressure fluid to said other chamber for reducing said degree and thereby propeller pitch and engine load until said first-mentioned pressure has reduced substantially to the existing value of speed line pressure.

11. In combination, a variable pitch propeller, an engine driving the propeller, power means operatively controlling according to its position the pitch of the propeller, said power means being controlled by opposing fluid pressures in one chamber and another chamber and biased to a flat-pitch-providing position when pressures in said chambers are equal and operable therefrom toward a maximum-pitch-providing position a degree corresponding to the extent by which fluid pressure in said one chamber exceeds that in said other chamber, one valve means providing one fluid pressure corresponding to a desired engine speed, another valve means providing another fluid pressure proportional to load condition of the engine, and pitch modifying valve means subject opposingly to said one fluid pressure and other fluid pressure and biased to a normal position in which said other chamber is vented thereby normally to cause propeller pitch to be controlled according to the pressure of fluid supplied to said one chamber, said pitch modifying valve means being operative responsively to preponderance of said other fluid pressure over said one fluid pressure to an abnormal position in which said chambers are interconnected thereby to effect a reduction in propeller pitch and hence engine load until said other fluid pressure is reduced to substantially the existing value of said one fluid pressure.

References Cited in the file of this patent

UNITED STATES PATENTS

| | | |
|---|---|---|
| 2,306,953 | Jung | Dec. 29, 1942 |
| 2,478,786 | Willi | Aug. 9, 1949 |
| 2,525,460 | Roesch | Oct. 10, 1950 |
| 2,878,880 | Gillespie | Mar. 24, 1959 |

FOREIGN PATENTS

| | | |
|---|---|---|
| 903,082 | France | Jan. 5, 1945 |
| 664,780 | Great Britain | Jan. 9, 1952 |